US009766768B2

(12) United States Patent
Swartz et al.

(10) Patent No.: US 9,766,768 B2
(45) Date of Patent: Sep. 19, 2017

(54) OPACITY METHOD AND DEVICE THEREFOR

(71) Applicant: KING.COM LIMITED, St. Julians (MT)

(72) Inventors: Patrik Swartz, Barcelona (ES); Ignacio Pintos Magdalena, Barcelona (ES)

(73) Assignee: KING.COM LIMITED, St. Julians (MT)

( * ) Notice: Subject to any disclaimer, the term of this patent is extended or adjusted under 35 U.S.C. 154(b) by 433 days.

(21) Appl. No.: 14/259,803

(22) Filed: Apr. 23, 2014

(65) Prior Publication Data

US 2015/0309666 A1    Oct. 29, 2015

(51) Int. Cl.

| | |
|---|---|
| *A63F 13/52* | (2014.01) |
| *G06F 3/0481* | (2013.01) |
| *A63F 13/23* | (2014.01) |
| *A63F 13/53* | (2014.01) |
| *A63F 13/54* | (2014.01) |
| *A63F 13/77* | (2014.01) |
| *A63F 13/837* | (2014.01) |
| *A63F 13/537* | (2014.01) |

(52) U.S. Cl.
CPC ............ *G06F 3/0481* (2013.01); *A63F 13/23* (2014.09); *A63F 13/52* (2014.09); *A63F 13/53* (2014.09); *A63F 13/537* (2014.09); *A63F 13/54* (2014.09); *A63F 13/77* (2014.09); *A63F 13/837* (2014.09)

(58) Field of Classification Search
CPC ........ G06F 3/0481; A63F 12/23; A63F 12/52; A63F 12/53; A63F 12/537; A63F 12/54; A63F 12/77; A63F 12/937
See application file for complete search history.

(56) References Cited

U.S. PATENT DOCUMENTS

| | | | | |
|---|---|---|---|---|
| 5,388,990 A | * | 2/1995 | Beckman | ............... G09B 9/08 345/419 |
| 2002/0002077 A1 | * | 1/2002 | Shimizu | ............... A63F 13/10 463/30 |

(Continued)

FOREIGN PATENT DOCUMENTS

| | | |
|---|---|---|
| EP | 1 825 894 A1 | 8/2007 |
| EP | 2441504 A2 | 4/2012 |

OTHER PUBLICATIONS

International Search Report, dated Jul. 2, 2015, and Written Opinion issued in corresponding International Application No. PCT/EP2015/058794

*Primary Examiner* — Corbett B Coburn
(74) *Attorney, Agent, or Firm* — Saul Ewing LLP

(57) ABSTRACT

A method of controlling a user interface having a display area comprising a plurality of game objects. The user interface also displays at least one other object, such as, for example, a displayed score. In a situation where the object at least partially overlay and at least partially obscures at least one of the game objects, then in response to a trigger condition a display characteristic of the object is modified to improve visibility of the at least one displayed game object. The trigger condition is, in one example, detecting user input associated with the at least one game object. The display characteristic of the object is, in one example, a transparency factor of the object. Therefore, it can be ensured that elements or information can be made visible to a user, as required.

17 Claims, 8 Drawing Sheets

(56) References Cited

U.S. PATENT DOCUMENTS

| | | | |
|---|---|---|---|
| 2006/0046844 A1* | 3/2006 | Kaneko | A63F 13/10 463/32 |
| 2006/0199626 A1 | 9/2006 | Ortiz et al. | |
| 2007/0168309 A1* | 7/2007 | Tzruya | A63F 13/10 706/45 |
| 2011/0125594 A1* | 5/2011 | Brown | G06Q 30/02 705/14.73 |
| 2013/0109468 A1* | 5/2013 | Okamura | A63F 13/52 463/30 |
| 2014/0133755 A1* | 5/2014 | McCloskey | G06T 11/60 382/173 |
| 2015/0310660 A1* | 10/2015 | Mogilefsky | G06T 13/40 345/422 |
| 2016/0023110 A1* | 1/2016 | Tawarayama | A63F 13/56 463/6 |
| 2016/0275717 A1* | 9/2016 | Mizoguchi | G06T 19/00 |

* cited by examiner

OPACITY METHOD AND DEVICE THEREFOR

FIELD OF THE INVENTION

Some embodiments may relate to controlling a user interface responsive to user engagement with displayed objects on the interface of a computer device.

Some embodiments may relate in particular, but not exclusively to computer devices having a user interface for engaging users or players in a computer game executable in an online or offline environment.

BACKGROUND OF THE INVENTION

There are many technical challenges and technical considerations facing the designer of computer games executed on user or computer devices having a user interface, such as designing a controllable user interface in the context of available computer devices and resources, which may be limited.

Another technical challenge can involve enabling a game to be fun, accessible and compelling even when there is limited display resource available, such as when a game is being played on a smartphone, tablet or other small or portable computer.

Another significant challenge is that of user engagement. Engagement involves designing gameplay to be engaging and rewarding to players. This typically requires games to be easily understood at their simplest or introductory levels, providing rewarding gameplay with simple to complex game mechanics, and becoming progressively more challenging so that players are not bored, but remain engaged and develop rewarding skills.

Effective engagement may also require various forms of feedback based on the game mechanics and successful utilisation by the user to reinforce the user or player sense of success and accomplishment.

Providing effective feedback in real time during game play, without hindering or disengaging the player is not trivial, especially when limited display resource may be available on the user device.

There are therefore many technical challenges when designing computer implemented games, particularly in providing a challenge to a user or player that is engaging with feedback that ultimately rewards the user so as to provoke repeat play without disengaging or frustrating the user. This may, but not exclusively apply to "casual games".

SUMMARY OF THE INVENTION

The inventors have recognised that there is a problem in displaying feedback information such as scores, offers or advertisements in an active area of a display which may therefore obscure essential elements or other information currently displayed to the user.

According to a first aspect, there is provided a method of controlling a user interface responsive to user input with a display area comprising a plurality of game object positions on said interface, the method comprising the following implemented by at least one processor of a device in communication with said interface and at least one memory: displaying an area having a plurality of game objects displayed at said game object positions, displaying at least one first object having one or more display characteristics in a first area of said displayed area overlaying at least partially at least one displayed game object on said area, detecting a trigger event associated with said first area, modifying said one or more display characteristics of said first object in dependence on detection of said trigger event, and displaying said first object in said first area with said modified characteristic.

In an embodiment according to the above aspect, the one or more display characteristics of said first object may comprise a transparency factor.

In an embodiment according to the above aspect, the transparency factor may comprise alpha blending.

In another embodiment the modification of said one or more display characteristics of said first object may be repeated so as to provide a gradual displayed transparency transition of the first object from an initial level to a set transparency level.

In another embodiment, the repeated modification may be reversed after a threshold associated with the trigger event is reached.

In another embodiment, the trigger event associated with said first area may comprise detecting user input associated with said at least one game object coinciding with or overlaid by said first area.

In another embodiment, the trigger event associated with said first area may comprise detecting a user object or a user object trajectory that causes said processor to display said user object within the first area in dependence on user input.

In another embodiment, the one or more first object display characteristics may further comprise object type.

In another embodiment, the object type characteristic may comprise a current or high score.

In another embodiment, the object type characteristic may comprise an offer or advertisement.

In yet another embodiment, the applications may comprise computer implemented games, or may comprise computer implemented office suite or productivity applications.

In another aspect, there is provided a device having a user interface responsive to user input with a display area comprising a plurality of game object positions, at least one memory storing a plurality of game objects and associated characteristics and at least one first object with one or more display characteristics, and at least one processor in communication with said interface and said at least one memory, the at least one processor configured to: display the area having a plurality of game objects displayed at said game object positions on said interface, display the at least one first object having one or more display characteristics in a first area of said area overlaying at least partially at least one displayed game object, detect a trigger event associated with said first area, modify said one or more display characteristics stored in said at least one memory of said first object in dependence on detection of said trigger event, and display said first object in said first area with said modified characteristic.

In an embodiment of the above device aspect, the at least one first object characteristics stored in said at least one memory may comprise a transparency factor.

In an embodiment, the stored transparency factor may comprise alpha blending.

In an embodiment, the trigger event associated with said first area may comprise said processor receiving via said interface user input associated with at least one game object coinciding with or overlaid by said first area.

In an embodiment, the trigger event associated with said first area may comprise said processor receiving via said interface user input associated with a user object or user object trajectory that causes said processor to display said user object coinciding with at least one game object within said first area.

In an embodiment, the device may be connected by a network interface to a server providing said first object and associated one or more display characteristics to said device.

In an embodiment, the provided first object one or more display characteristics may comprise a transparency factor, and optionally the transparency factor may comprise an initial state and an end state.

The initial state may comprise zero transparency and the end state may comprise transparency in the range 50% to 100%.

In yet another aspect, there is provided a server connected by a network interface to a device, having at least one memory or database storing at least one first object and associated one or more display characteristics including a transparency factor and configured to provide said at least one first object and associated display characteristics to said device.

In another aspect, there is provided a computer readable storage device storing program code instructions which, when executed by a processor causes said processor to: display on a user interface an area having a plurality of game objects displayed at game object positions, display at least one first object having one or more display characteristics in a first area of said interface overlaying at least partially at least one displayed game object on said area, detect a trigger event associated with said first area, modify said one or more display characteristics of said first object in dependence on detection of said trigger event, and display said first object in said first area with said modified characteristic.

In another aspect there is provided a computer program comprising program code instructions which when executed by a processor causes said processor to: display on a user interface an area having a plurality of game objects displayed at game object positions, display at least one first object having one or more display characteristics in a first area of said interface overlaying at least partially at least one displayed game object on said area, detect a trigger event associated with said first area, modify said one or more display characteristics of said first object in dependence on detection of said trigger event, and display said first object in said first area with said modified characteristic.

In another aspect there is provided a device having user interface means responsive to user input with display means displaying an area comprising a plurality of game object positions stored in at least one memory means, the memory means further storing game objects and associated characteristics and at least one first object with one or more display characteristics, the device having at least one processing means in communication with said user interface means via communication means, the at least one processing means being configured to: display the area having a plurality of game objects displayed at said game object positions on said display means, display on said display means the at least one first object having one or more display characteristics in a first area of said displayed area overlaying at least partially at least one displayed game object, detect a trigger event associated with said first area, modify said one or more display characteristics of said first object stored in said at least one memory means in dependence on detection of said trigger event, and display on said display means said first object in said first area with said modified characteristic.

The display means may comprise user interface means.

The user interface means may comprise input means for receiving user input.

The input means may comprise touch control means.

The touch control means may comprise capacitive, resistive or gesture detecting means.

The memory means for storing said game objects, first game object and associated one or more display characteristics may be local or remote memory means connectable to the device via internal bus means or accessible via network interface means.

The network means may comprise a wide area network, such as the internet for example.

The memory means may be located with, or accessible by the device through a server having connection means connecting said server and device via the network means.

The one or more display characteristics may comprise transparency factor means, having an optional range of values including an initial state and an end state for rendering by graphic controller means onto said display means.

Other aspects and features are described with reference to the appended claims.

BRIEF DESCRIPTION OF DRAWINGS

To understand some embodiments, reference will now be made by way of example only to the accompanying drawings, in which.

DETAILED DESCRIPTION OF THE INVENTION

Figure 1:
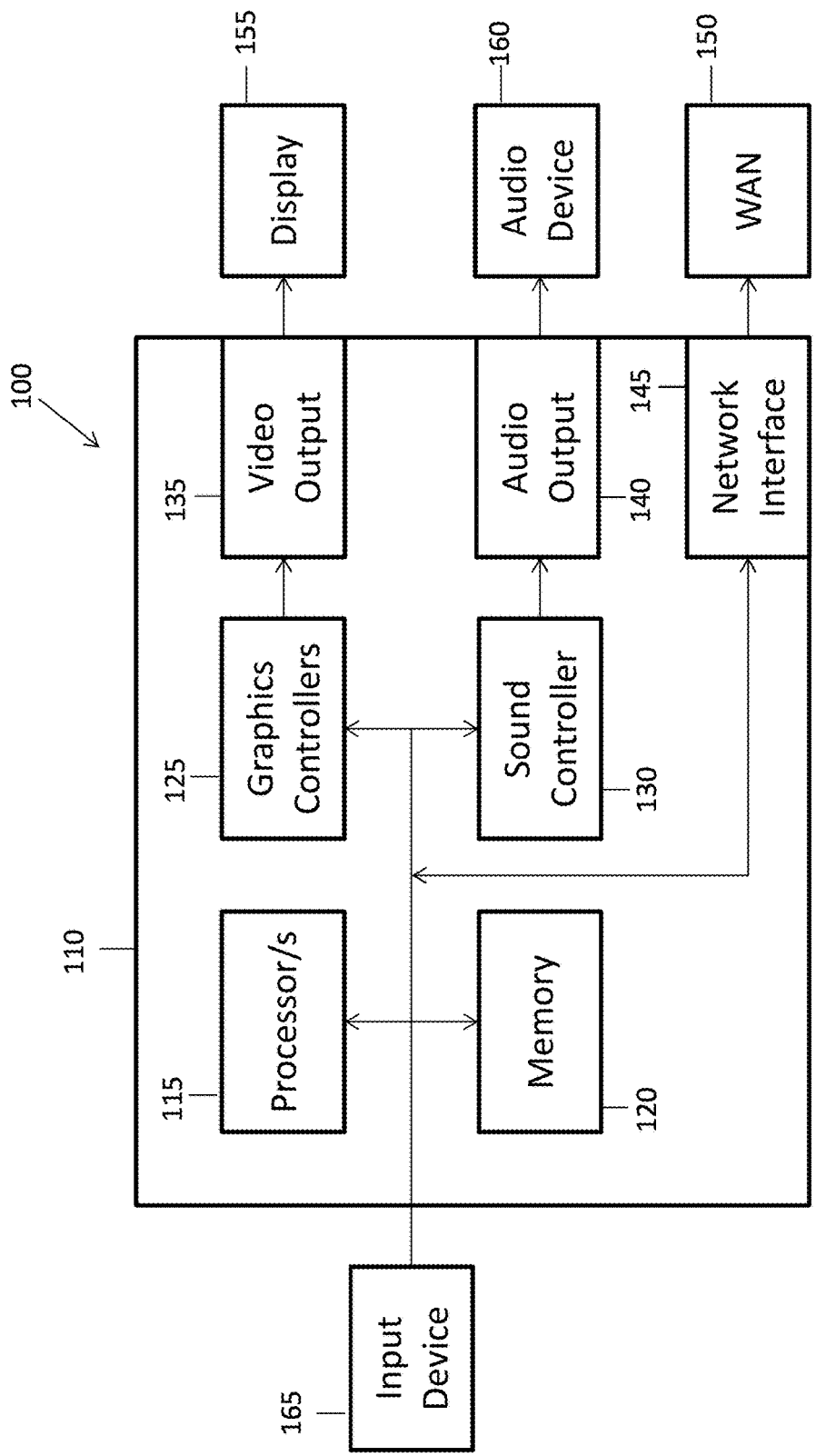
FIG. 1 shows an example client or user device of an embodiment.

A schematic view of a client or user device 100 according to an embodiment is shown in FIG. 1. All of the blocks shown are implemented by suitable circuitry. The blocks may be implemented in hardware and/or software. The user device may have a control part 110. The control part 110 has one or more processors 115 and one or more memories 120. The control part 110 is also shown as having a graphics controller 125 and a sound controller 130. It should be appreciated that one or other or both of the graphics controller 125 and sound controller 130 may be provided by the one or more processors 115.

The graphics controller 125 is configured to provide a video output 135. The sound controller 130 is configured to provide an audio output 140. The controller 110 has an interface 145 allowing the device to be able to communicate with a network 150 such as the Internet or other communication infrastructure.

The video output 135 is provided to a display 155. The audio output 140 is provided to an audio device 160 such as a speaker and/or earphone(s).

The device 100 has an input device 165. The input device 165 can take any suitable format and can be one or more of a keyboard, mouse, touch screen, joystick or game controller. It should be appreciated that the display 155 may in some embodiments also provide the input device 165 by way of an integrated touch screen for example.

The blocks of the controller 110 are configured to communicate with each other by an interconnect such as a bus or any other suitable interconnect and/or by point to point communication.

It should be appreciated that in some embodiments, the controller 110 may be implemented by one or more integrated circuits, at least in part.

The user device 100 is shown by way of example only. In alternative embodiments, one or more of the parts may be omitted. Alternatively or additionally, some embodiments may comprise one or more other parts. Alternatively or additionally, one or more parts may be combined.

Figure 2:
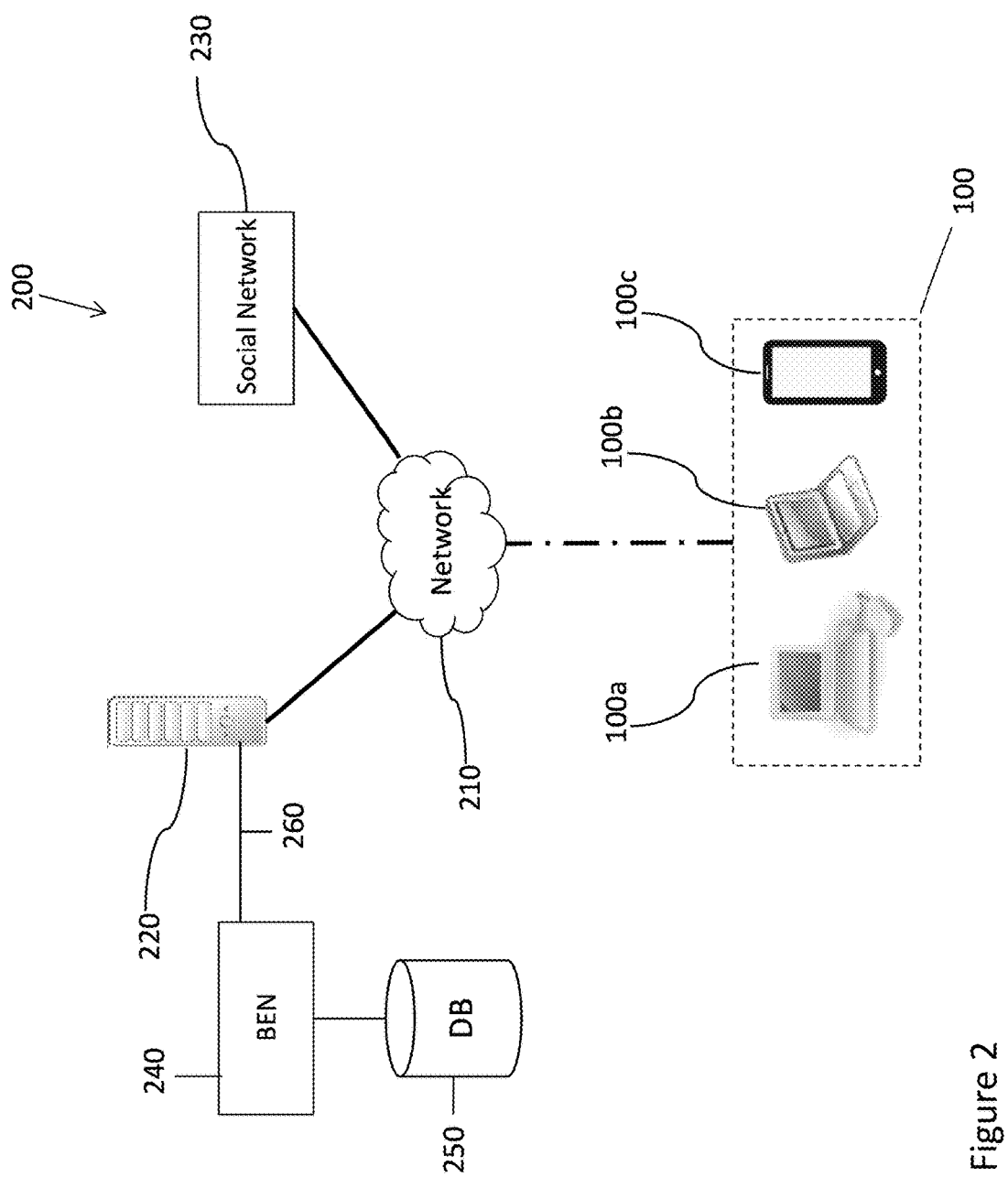
FIG. 2 illustrates an example system in which some embodiments may be provided.

FIG. 2 schematically shows a system 200 in some embodiments. The system 200 comprises a server 220 which may store or be in communication with databases 250 which may be, in some embodiments, connected to a back end infrastructure 240 "BEN") of game player's details, profiles, statistics, etc. In practice, one or more databases 250 may be provided. Where more than one server 220 is provided, the database(s) 250 may be provided in one database 250 or across two or more servers 220, 310. The server 220 may also have a games data function. This may comprise one or more units of memory to store the computer game program and user behaviour data, and a processor to run the games program and process the user behaviour data.

The server 220 may communicate via for instance the internet 210 to one or more client or user devices 100, shown in the figure by way of example as user devices 100a, 100b and 100c, and may further provide connections to a social network 230 such as Facebook™.

Figure 5:
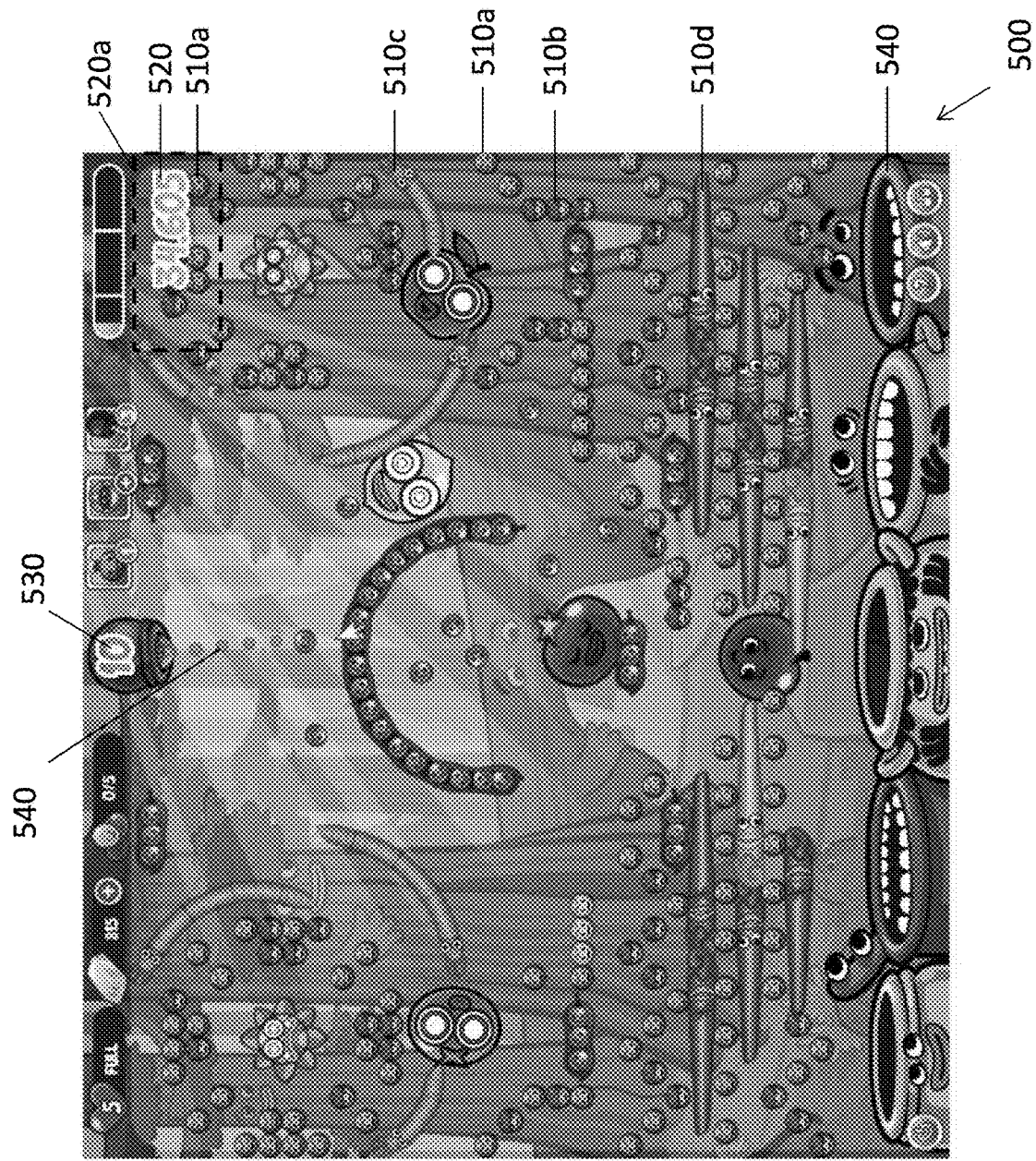
FIG. 5 shows an example game screen before modification according to an embodiment.
Figure 6:
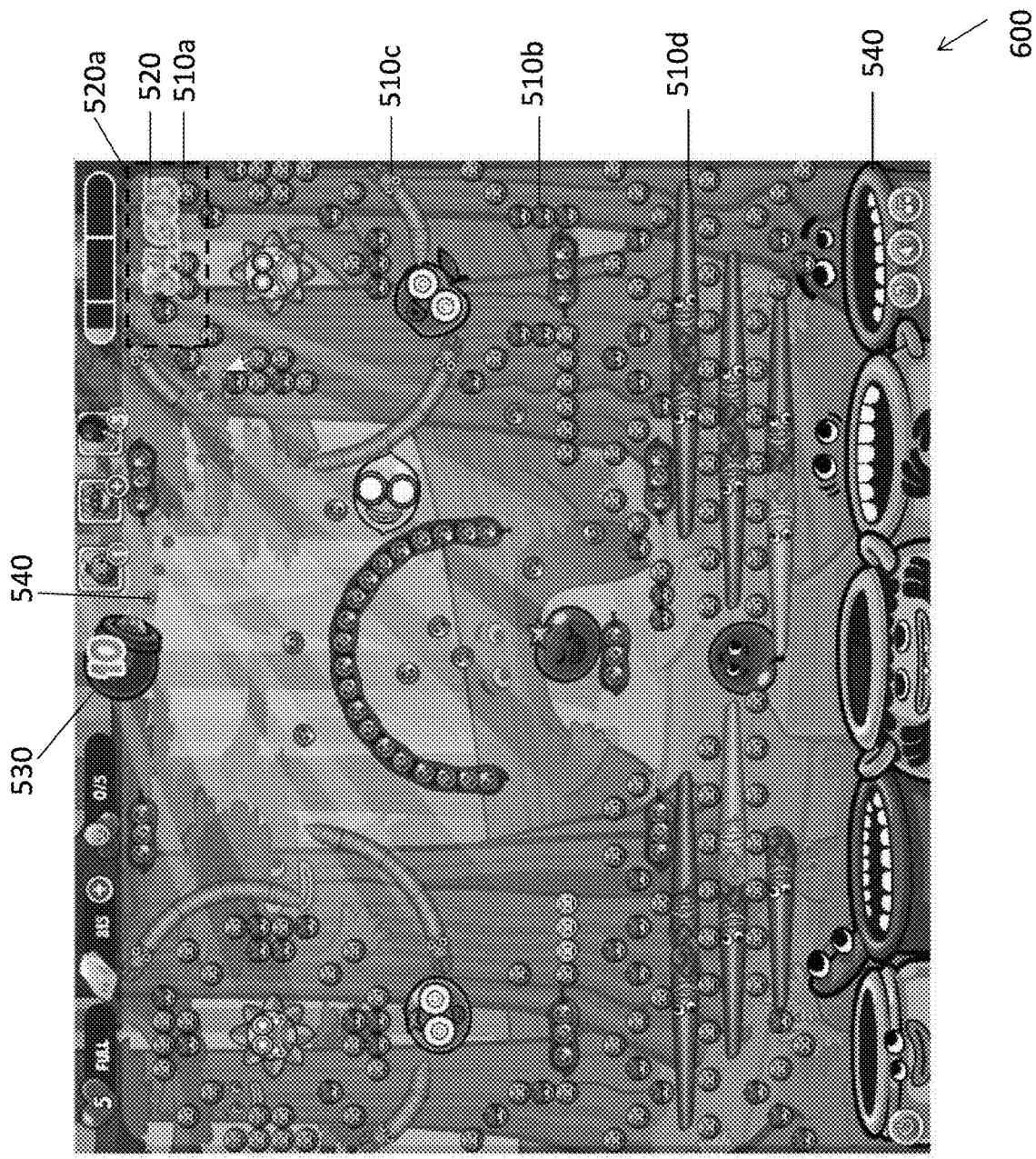
FIG. 6 shows an example game screen during modification according to an embodiment.
Figure 7:
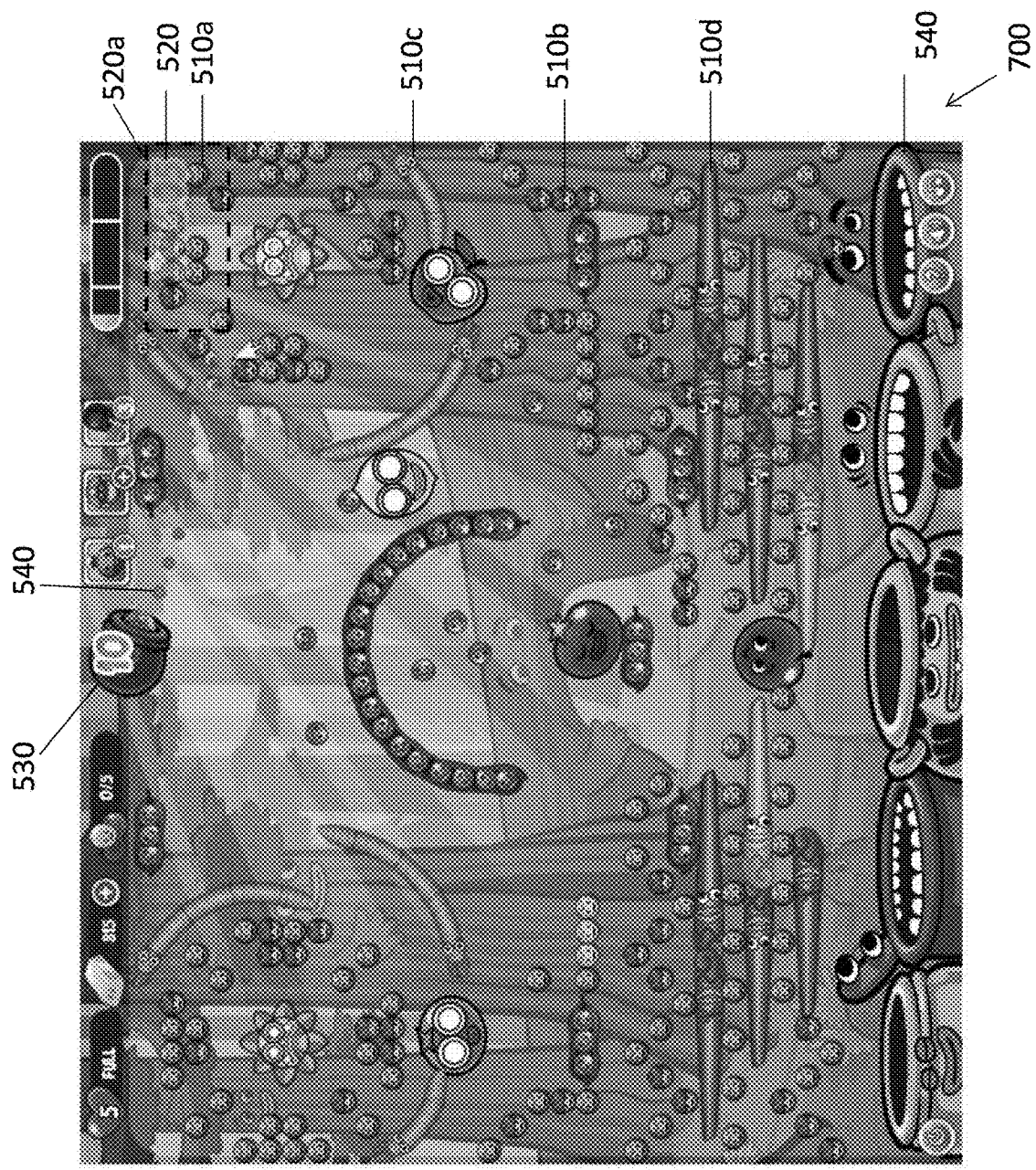
FIG. 7 depicts an example game screen after modification according to an embodiment.

FIGS. 5, 6 and 7 illustrate screen shots of an example computer implemented game. FIG. 5 shows game objects 510a, 510b, 510c and 510d which must be, in this example eliminated by collision with a user object projectile 530 which is aimed by the user using for example touch input or mouse or other pointing device input on a user selected collision trajectory 540 with the game objects 510a, 510b, 510c, 510d. The screenshots are of "Papa Pear saga" by King.com, but those skilled in the art will recognise that other games and game mechanics, such as so-called "match-3" or "bubble shooters" or "pinball" type games may equally avail themselves to the embodiments herein described.

As can be seen clearly in FIG. 5, a first object 520 in the form of the current score 520 is overlaid on the game area and is displayed partially obscuring game objects 510a and 510b. The first object occupies a first area 520a overlaying at least partially at least one displayed game object 510a as shown in the Figure.

The form of the first object 520 in this embodiment comprises a current score indicator. This is by way of description and to aid understanding and is not limiting.

For example, in other embodiments, the first object 520 may be a graphic depiction of other useful feedback or user or application oriented information, such as for example current progress towards a target, optional offers, extras such as "missions", "quests" or offers of game objects or elements such as so-called "boosters", depending on the game or application currently being executed by processor 115, 220.

In this embodiment, with reference to FIG. 5, the first object 520 comprises a graphical depiction or representation of the current score. Therefore, the user or player, in wishing to target game objects 510a and 510b in the vicinity of the first object 520 may feel frustration and disengagement since the first object 520, in this embodiment the current score 520, is obscuring the game objects 510a, 510b upon which it overlays and which the user may wish to target input. The first object 520 is provided with associated display characteristics stored in memory 120 of the device 100 or in the network 250 as previously described with reference to FIG. 2.

The associated display characteristics comprise at least a transparency factor in addition to size, colour and other attributes such as whether the first object is selectable and actions that may follow should it be so selected, and other characteristics that may be provided as relevant to the form and function of the first object.

FIG. 6 illustrates an embodiment in which the user targets 540, or intends to target 540, a user projectile 530 towards the first object 520 and associated area 520a, since in this example the application "papa pear saga" involves the user launching projectiles 530 in a direction following a user input trajectory or guide 540 as shown in the Figure.

The input of the trajectory 540 coinciding with a first area 520a in which the first object 520 is located causes a trigger event detected by the at least one processor 115, 220. The processor may then proceed to execute instructions which include modifying a display characteristic comprising the transparency characteristic of the first object to increase transparency, and re-displaying said object 520, as can be seen in FIG. 6.

FIG. 7 illustrates a potential transparency modification 700 towards an end state in which, as can be clearly seen in FIG. 7, the game objects 510a, 510b previously obscured by the first object 520 and its associated area 520a are now visible via the modified transparency characteristic of displayed and modified first object 520.

Figure 8:
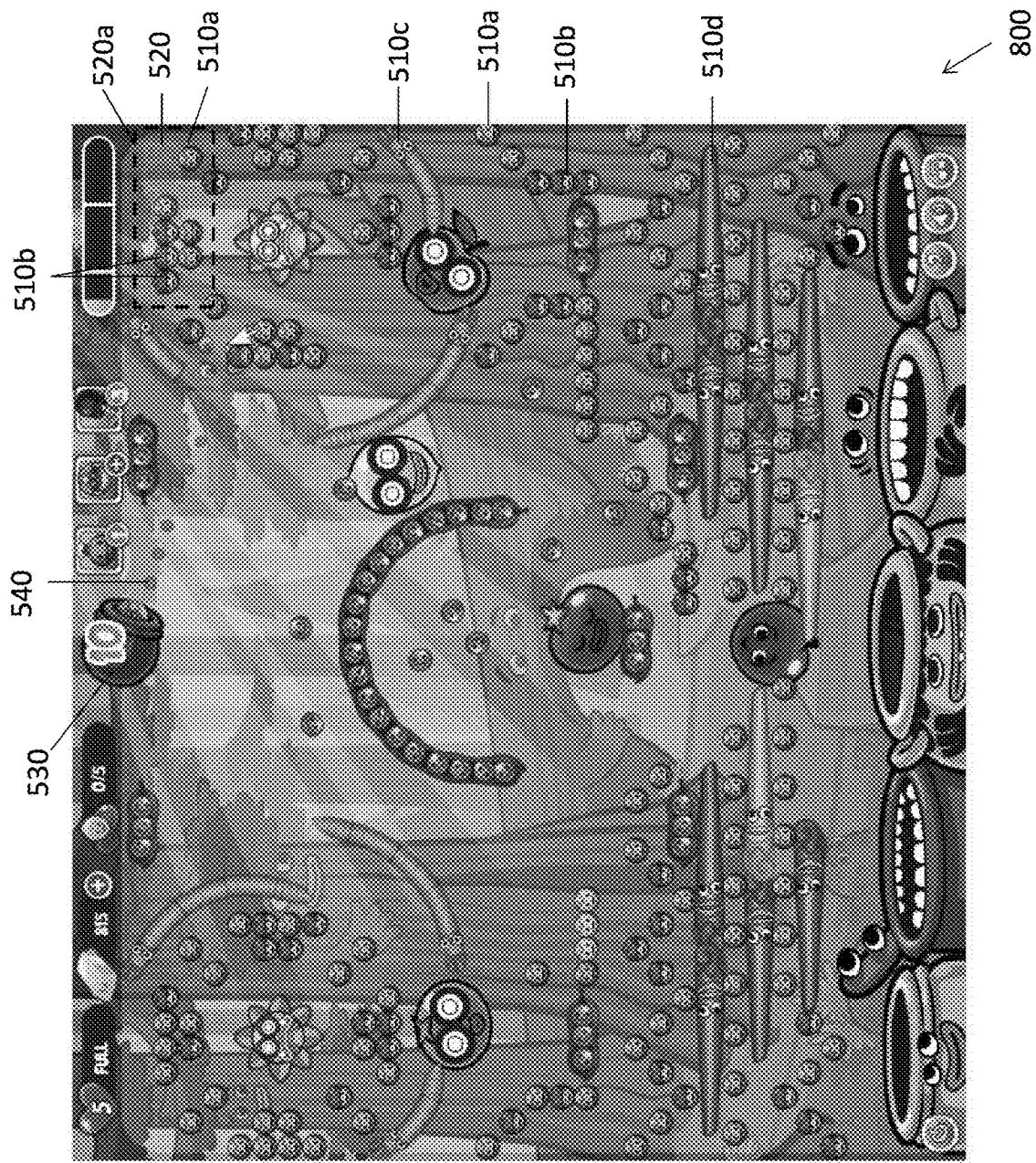
FIG. 8 depicts an example game screen showing an example end state of modification according to an embodiment.

FIG. 8 illustrates a potential transparency modification at a predefined end state in which, as seen with reference to FIG. 8, the first game object 520 is barely visible with all game objects 510a, 510b located within the first area 520a previously obscured now rendered visible "through" the displayed first object 520 with a transparency characteristic modified to the end state. This end state may comprise an indicator of greater than 90% transparency for example.

An embodiment of a method will now be described with reference to FIG. 3 and FIGS. 5, 6, 7 and 8.

Figure 3:
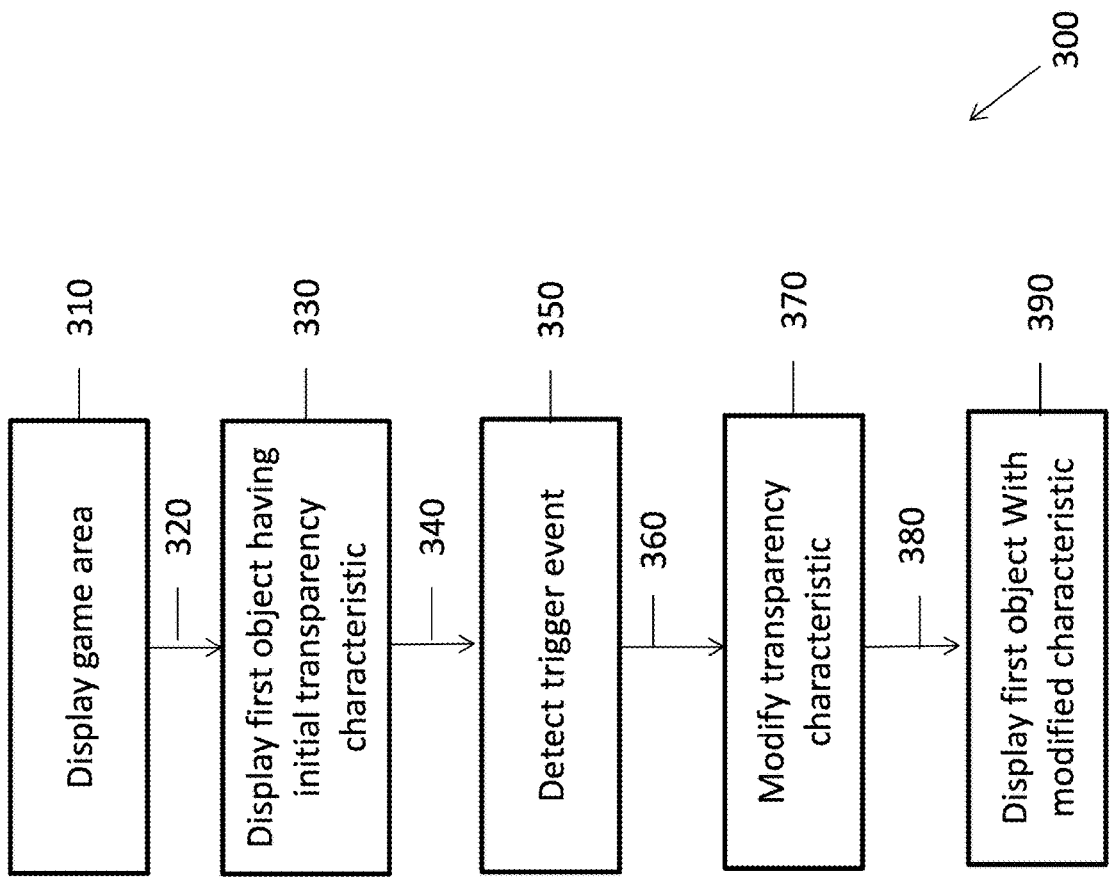
FIG. 3 shows an example flowchart of a method according to an embodiment.

FIG. 3 illustrates a flow diagram 300 in which at step 310 processor 115 retrieves from memory 120 or server 220 via network 210 an application which may include a computer implemented game with game area 500 and associated game objects 510a, 510b, 510c, 510d to display.

In an embodiment wherein the game is a "shooter" game, the processor may also retrieve for display player or user objects 530 such as user launched and controlled projectiles or trajectory aiming aids 540 for such projectiles.

In some embodiments wherein the application is a touch or mouse controlled game, user interface elements such as pointers may or may not be displayed as appropriate for the haptic interface hardware and resources available.

Regardless of application or game type, the processor 115 then proceeds via path 320 to step 330 wherein a first object having an initial display characteristic defining a transparency state is displayed in a first area of the game area.

In an embodiment, the initial transparency state characteristic may be effectively zero. Hence, the first object 520 may not be transparent at all when displayed, and will overlay any game objects when displayed within its associated area 520a.

The processor 115 subsequently monitors via path 340 for a trigger event 350 and upon such detection proceeds via path 360 to step 370.

The trigger event may comprise in some embodiments touch input detected within the first area 520a.

In other embodiments the trigger event may comprise detecting a user object 530 or a selected user object trajectory 540 that causes said processor 115 to display said user object within the first area 520a in dependence on user input. Hence, the aiming or targeting of user objects 510a, 510b at, or to eventually coincide with the first area containing the first object may equally comprise trigger events in some embodiments.

Of importance is actual or potential interaction within the first area 520a of the game area 500 comprising game objects 510a, 510b, 510c, 510d overlaid by or obscured by the displayed first object 520 with its associated initial characteristic.

Hence, for other game paradigms or types, other trigger events may be suitable, such as a "match-3" event that causes subsequent "match" or scoring events automatically in response to the initial input, the subsequent events occurring with the vicinity or within the first area 520a obscured by the first object 520.

That is, initial input may lead to subsequent automatic "cascade" (for matching paradigms) or "bounce" (in the context of pinball type paradigms such as Papa Pear Saga™) procedures which themselves may cause the processor to detect in advance events which may occur within the area 520a of the first object 520.

The processor, upon detecting such a trigger event 350 proceeds via path 360 to step 370 wherein the transparency characteristic, such as an alpha attribute is modified in a direction so as to increase the transparency of the first object (or decrease it's opacity) when displayed.

Flow then proceeds via path 380 to step 390 wherein the first object is then re-displayed with its associated modified transparency or alpha characteristic.

The modification may be done in a single pass, for example in one embodiment the alpha characteristic may simply be increased to 50% with 0% representing full opacity (i.e. no transparency) and 90% representing an almost fully transparent end state (with for example 100% indicating full transparency, i.e. the first object would be invisible when displayed).

In other embodiments, which will now be described with reference to FIG. 4, the modification may smoothly transition the visual appearance of the first object 520 from opaque, through to a transparency threshold defining an end state such as for example 90%, and subsequently back again to full opacity in real time.

Figure 4:
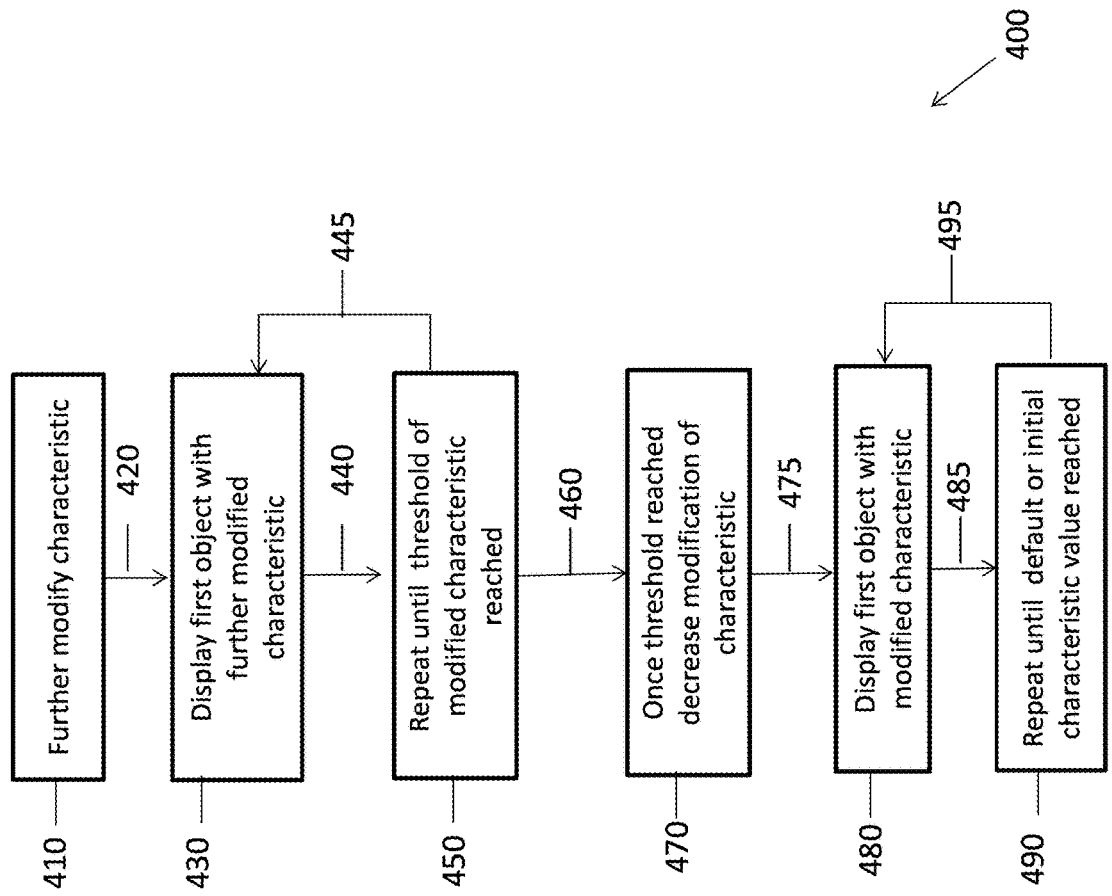
FIG. 4 illustrates a flowchart of a method according to another embodiment.

FIG. 4, illustrates an example embodiment of a method 400 in which an already modified, by for example by the scheme of FIG. 3, first object 520 characteristic is then further modified at step 410, and subsequently via path 420 the first object 520 having the further modified characteristic is displayed at step 430. Flow may then proceed in some embodiments via path 440 to step 450 wherein step 430 and step 450 are repeated via path 445 until a threshold such as an end state parameter as previously described is reached.

In one example, the transparency characteristic may be modified in smooth increasing steps from for example 0% (no transparency) up to say 80 or 90% transparency (see FIG. 7). This may be achieved either step wise or gradually depending on the application and time available for the transition or on dependence on further user input removing the focus of events away from for example area 520a by adjusting trajectory 540 or by providing input in another area of the game area 500.

When the threshold is reached, the processor may then proceed via path 460 to step 470 wherein the characteristic is modified (for example decreased) at step 480 to return to its initial state or value at step 490.

In an embodiment the transparency characteristic may be modified in smooth steps from for example 90% (almost full transparency) to say 10 or 0% transparency (i.e. the first object 520 is opaque as shown in FIG. 5). This may be achieved either step wise or gradually by repeating steps 480 and 490 via path or loop 495 depending on the application and time available for the transition or on dependence on further user input removing the focus of events or actions away from for example area 520a (and hence not providing trigger events) by adjusting trajectory 540 or by providing input in another area of the game area 500.

Hence, a first object 520 may be displayed to a user on a game area 500 and its display characteristics modified automatically to allow the user to interact with game objects overlaid by the first object, with the modification being actioned only when actually required based on trigger events indicating action or potential action in the area 520a of the first object 520 obscuring actionable, playable or otherwise targetable game elements or objects 510a, 510b, 510c, 510d.

Those skilled in the art will appreciate that the transparency characteristic may comprise techniques such as alpha blending depending on the graphics chipset 125 and associated methodology utilised in the user device 100. Hence, a first object 520 providing useful feedback to a user may be triggered to be modified so as to automatically fade out and fade back when appropriate depending on real time input.

The first object 520 may comprise syndicated or other content such as advertisements or offers of partners associated with the application provider and dependent on user preferences in viewing such content.

A person skilled in the art will realise that the different approaches to implementing the methods and device considerations herein are not exhaustive, and that which is described comprises certain embodiments. It is possible to implement the above in a number of variations without departing from the spirit or scope of the invention.

The invention claimed is:

1. A method of controlling a user interface responsive to user input with a display area comprising a plurality of game object positions on said interface, the method comprising the following implemented by at least one processor of a device in communication with said interface and at least one memory:

displaying an area having a plurality of game objects displayed at said game object positions, a game objective being to eliminate the game objects from the display area by collision with one or more user objects;

displaying at least one first object having one or more display characteristics in a first area of said displayed area, the at least one first object overlaying at least partially at least one displayed game object on said area, said at least one displayed game object being at least partially obscured by said first object such that the at least one displayed game object has a first visibility state;

detecting a trigger event associated with said first area, the trigger event comprising a prediction that a user object trajectory or a user input comprising aiming or targeting a user object trajectory will cause the user object to coincide with the first area;

modifying said one or more display characteristics of said first object in response to detection of said trigger event so as to modify visibility of the at least one displayed game object from the first visibility state to a second, improved visibility state, and displaying said first object in said first area with said modified characteristic.

2. A method according to claim 1, wherein the one or more display characteristics of said first object comprise a transparency factor.

3. A method according to claim 2, wherein the transparency factor comprises alpha blending.

4. A method according to claim 1, wherein the modification of said one or more display characteristics of said first object is repeated so as to provide a gradual displayed transparency transition of the first object from an initial level to a set transparency level.

5. A method according to claim 4, wherein the repeated modification is reversed after a threshold associated with the trigger event is reached.

6. A method according to claim 1, wherein the one or more first object display characteristics further comprise object type.

7. A method according to claim 6, wherein the object type characteristic comprises a current or high score.

8. A method according to claim 6, wherein the object type characteristic comprises an offer or advertisement.

9. A device having a user interface responsive to user input with a display area comprising a plurality of game object positions, at least one memory storing a plurality of game objects and associated characteristics and at least one first object with one or more display characteristics, and at least one processor in communication with said interface and said at least one memory, the at least one processor configured to:

display the area having a plurality of game objects displayed at said game object positions on said interface, a game objective being to eliminate the game objects from the display area by collision with one or more user objects;

display the at least one first object having one or more display characteristics in a first area, the at least one first object overlaying at least partially at least one displayed game object on said area, said at least one displayed game object being at least partially obscured by said first object such that the at least one displayed game object has a first visibility state;

detect a trigger event associated with said first area, the trigger even comprising a prediction that a user object trajectory or a user input comprising aiming or targeting a user object trajectory will cause the user object to coincide with the first area;

modify said one or more display characteristics stored in said at least one memory of said first object in response to detection of said trigger event so as to modify visibility of the at least one displayed game object from the first visibility state to a second, improved visibility state, and display said first object in said first area with said modified characteristic.

10. A device according to claim 9, wherein the at least one first object characteristics stored in said at least one memory comprises a transparency factor.

11. A device according to claim 10, wherein the stored transparency factor comprises alpha blending.

12. A device according to claim 9 connected by a network interface to a server providing said first object and associated one or more display characteristics to said device.

13. A device according to claim 12, wherein the provided first object one or more display characteristics comprise a transparency factor.

14. A device according to claim 13, wherein the transparency factor comprise an initial state and an end state.

15. A device according to claim 14, wherein the initial state comprises zero transparency and the end state comprises transparency in the range 50% to 100%.

16. A system comprising:

a device having a user interface responsive to user input with a display area comprising a plurality of game object positions, at least one memory storing a plurality of game objects and associated characteristics and at least one first object with one or more display characteristics, and at least one processor in communication with said interface and said at least one memory, the at least one processor configured to:

display the area having a plurality of game objects displayed at said game object positions on said interface, a game objective being to eliminate the game objects from the display area by collision with one or more user objects;

display the at least one first object having one or more display characteristics in a first area, the at least one first object overlaying at least partially at least one displayed game object on said area, said at least one displayed game object being at least partially obscured by said first object such that the at least one displayed game object has a first visibility state;

detect a trigger event associated with said first area, the trigger event comprising a prediction that a user object trajectory or a user input comprising aiming or targeting a user object trajectory will cause the user object to coincide with the first area;

modify said one or more display characteristics stored in said at least one memory of said first object in response to detection of said trigger event so as to modify visibility of the at least one displayed game object from the first visibility state to a second, improved visibility state, and display said first object in said first area with said modified characteristic; and a server connected by a network interface to said device, the server having at least one memory or database storing the at least one first object and associated one or more display characteristics including a transparency factor, the server configured to provide said at least one first object and associated display characteristics to said device.

17. A computer readable storage device storing program code instructions which, when executed by a processor causes said processor to:

display on a user interface an area having a plurality of game objects displayed at game object positions, a game objective being to eliminate the game objects from the display area by collision with one or more user objects;

display at least one first object having one or more display characteristics in a first area of said interface, the at least one first object overlaying at least partially at least one displayed game object on said area, said at least one displayed game object being at least at partially obscured by said first object such that the at least one displayed game object has a first visibility state;

detect a trigger event associated with said first area, the trigger event comprising a prediction that a user object trajectory or a user input comprising aiming or targeting a user object trajectory will cause the user object to coincide with the first area;

modify said one or more display characteristics of said first object in response to detection of said trigger event so as to modify visibility of the at least one displayed game object from the first visibility state to a second, improved visibility state, and display said first object in said first area with said modified characteristic.

* * * * *